(12) United States Patent
Dean et al.

(10) Patent No.: US 8,699,534 B2
(45) Date of Patent: Apr. 15, 2014

(54) LASER DIODE DRIVER WITH WAVE-SHAPE CONTROL

(71) Applicant: Texas Instruments Incorporated, Dallas, TX (US)

(72) Inventors: Douglas Warren Dean, Eagan, MN (US); Shengyuan Li, Irving, TX (US); Indumini W. Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 13/963,670

(22) Filed: Aug. 9, 2013

(65) Prior Publication Data

US 2013/0329759 A1    Dec. 12, 2013

Related U.S. Application Data

(62) Division of application No. 13/662,712, filed on Oct. 29, 2012, now Pat. No. 8,537,868, which is a division of application No. 12/758,160, filed on Apr. 12, 2010, now Pat. No. 8,325,583.

(60) Provisional application No. 61/186,298, filed on Jun. 11, 2009, provisional application No. 61/186,299, filed on Jun. 11, 2009.

(51) Int. Cl.
*H01S 3/00* (2006.01)
*G11B 7/00* (2006.01)

(52) U.S. Cl.
USPC ........................................ 372/38.02; 369/116

(58) Field of Classification Search
None
See application file for complete search history.

(56) References Cited

U.S. PATENT DOCUMENTS

| | | | |
|---|---|---|---|
| 6,278,665 B1 * | 8/2001 | Schell et al. | 369/13.22 |
| 7,154,923 B2 * | 12/2006 | Kucharski | 372/29.015 |
| 7,324,570 B2 * | 1/2008 | Moran | 372/26 |
| 7,449,873 B2 * | 11/2008 | Schaffer et al. | 323/315 |
| 7,609,098 B2 * | 10/2009 | Bergmann | 327/108 |
| 2005/0002316 A1 * | 1/2005 | Maruyama | 369/116 |
| 2005/0195869 A1 * | 9/2005 | Kubota | 372/38.02 |
| 2005/0265155 A1 * | 12/2005 | Iwano et al. | 369/47.1 |
| 2007/0205810 A1 * | 9/2007 | Rees et al. | 327/108 |
| 2009/0245056 A1 * | 10/2009 | Doi et al. | 369/53.35 |

* cited by examiner

*Primary Examiner* — Paul Huber
(74) *Attorney, Agent, or Firm* — Lawrence J. Bassuk; Wade J. Brady, III; Frederick J. Telecky, Jr.

(57) ABSTRACT

An optical disk drive system associated with a laser diode is described. The optical disk drive system comprises a current generator for receiving input signals; a current switch coupled to receive timing signals; a current driver coupled to receive output signals from the current switch and the current generator, the current driver further comprising a driver with wave shape control selected from the group consisting of a laser diode read driver and a laser diode write driver, wherein the driver with shape control is operative for transmitting at least one output signal that is a scaled version of at least one of the output signals received from the current generator, wherein the current driver is operative for transmitting at least one output signal driving the laser diode.

3 Claims, 11 Drawing Sheets

LASER DIODE DRIVER WITH WAVE-SHAPE CONTROL

CROSS REFERENCE TO RELATED APPLICATION(S)

This application is a Divisional of prior Application Ser. No. 13/662,712, filed Oct. 29, 2012, now U.S. Pat. No. 8,537,868, issued Sep. 17, 2013;

Which was a divisional of prior Application Ser. No. 12/758,160, filed Apr. 12, 2010, now U.S. Pat. No. 8,325,583, issued Dec. 4, 2012;

The present application claims priority to jointly owned U.S. Provisional Application corresponding to application No. 61/186,298 entitled "Laser Diode Write Driver with Wave-Shape Control." This provisional application was filed on Jun. 11, 2009. The present application also claims priority to jointly owned U.S. Provisional Application corresponding to application No. 61/186,299 entitled "Laser Diode Read Driver." This provisional application was filed on Jun. 11, 2009.

DESCRIPTION OF RELATED ART

With the evolution of electronic devices, there is a continual demand for enhanced speed, capacity and efficiency in various areas including electronic data storage. Motivators for this evolution may be the increasing interest in video (e.g., movies, family videos), audio (e.g., songs, books), and images (e.g., pictures). Optical disk drives have emerged as one viable solution for supplying removable high capacity storage. When these drives include light sources, signals sent to these sources should be properly processed so these sources emit the appropriate light for reading and writing data optically.

BRIEF DESCRIPTION OF THE DRAWINGS

The laser diode driver with wave shape control within the laser diode driver signal processing system may be better understood with reference to the following figures. The components within the figures are not necessarily to scale, emphasis instead being placed upon clearly illustrating the principles of the invention. Moreover, in the figures, like reference numerals designate corresponding parts or blocks throughout the different views.

Figure 1A:
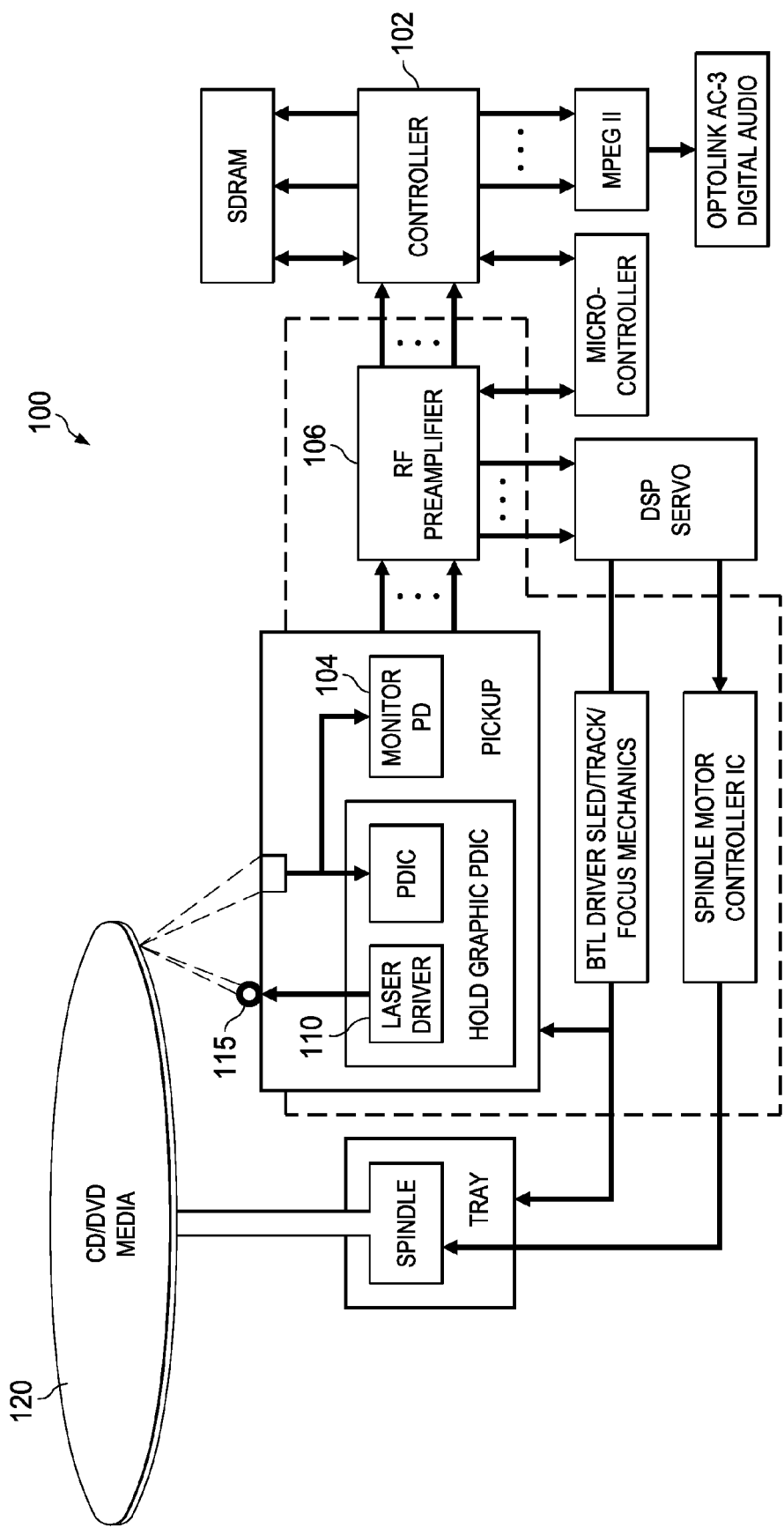
FIG. 1A, is a system drawing illustrating components within an optical disk drive.

While the laser diode driver with wave shape control is susceptible to various modifications and alternative forms, specific embodiments have been shown by way of example in the drawings and subsequently are described in detail. It should be understood, however, that the description herein of specific embodiments is not intended to limit the laser diode driver with wave shape control to the particular forms disclosed. In contrast, the intention is to cover all modifications, equivalents, and alternatives falling within the spirit and scope of the laser diode driver with wave shape control as defined by this document.

DETAILED DESCRIPTION OF EMBODIMENTS

As used in the specification and the appended claim(s), the singular forms "a," "an" and "the" include plural referents unless the context clearly dictates otherwise. Similarly, "optional" or "optionally" means that the subsequently described event or circumstance may or may not occur, and that the description includes instances where the event or circumstance occurs and instances where it does not.

Turning now to FIG. 1A, is a system drawing illustrating components within an optical disk drive 100. A controller 102 monitors the output light power level of a laser diode 115 using a Monitor PD 104, or monitor photodiode, and an RF, or radio frequency, preamplifier 106. This controller can keep an expected power level by changing an input control current of a laser driver 110 through an APC, or auto power controlling, feedback loop, even if a light source 115 such as a laser diode changes output power due to various conditions, such as temperature changes, etc.

Also, the controller 102 sets the enable signal for switching some current channels of the laser driver 110, which arranges a data writing pulse. In the case of data reading, the controller 102 may only set a DC current by disabling the switching channels and applying the designated current. In the case of data writing, the controller 102 applies some adjustment signals, or enable-switching signals, to arrange the writing pulse waveform as a combination of switching current pulses. The power level can be changed as each switching channel has its own designated current. The controller 102 can arrange these designated currents based on the Monitor PD 104 output with some detecting function in the RF preamplifier 106. At the very least, this controller has two power control levels, one for the read power and one for the write power.

As illustrated in this figure, the laser driver 110 sends a signal that prompts an associated light source 115 (e.g., laser diode) to emit light. The light source 115 may emit light at any of a number of wavelengths (e.g., 400 nm, 650 nm, 780 nm). Light from this source contacts an associated optical media 120, such as a compact disc (CD), blue ray device (Blu-ray), or digital versatile disk (DVD). Light contacting the optical media can either facilitate data storage or data retrieval from the optical media 120.

Figure 1B:
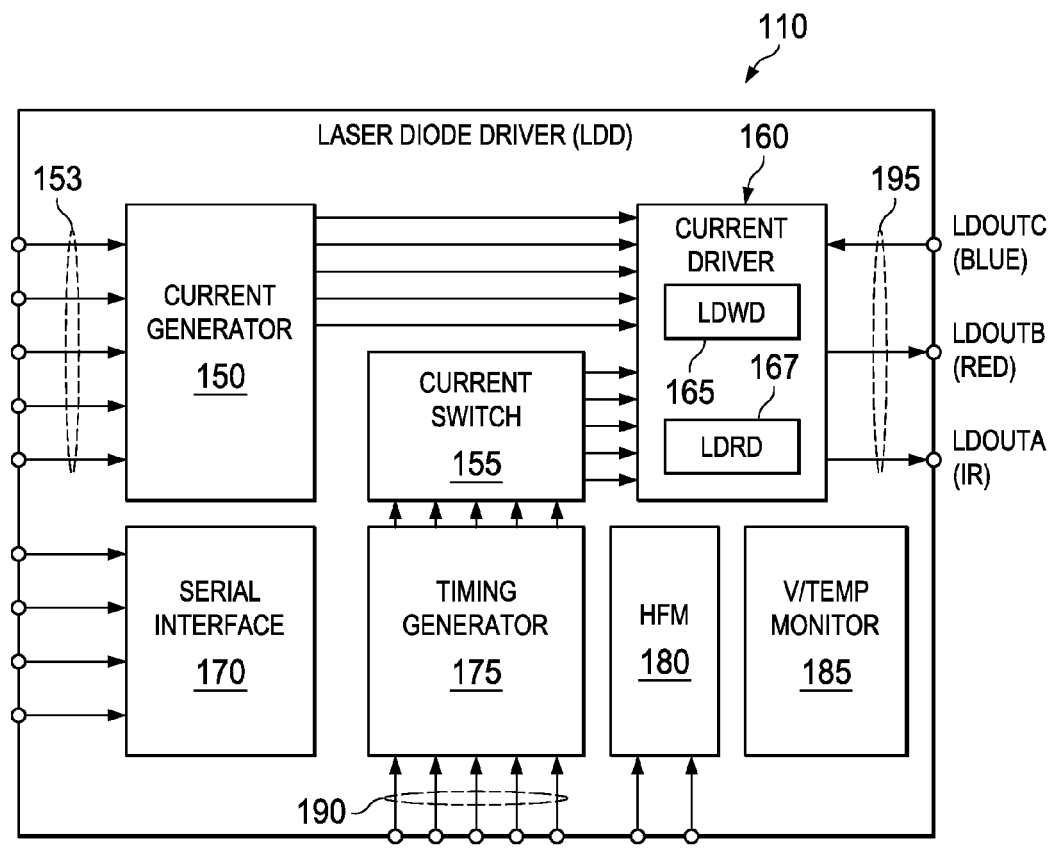
FIG. 1B is a block diagram illustrating an enlarged view of the innovative laser diode driver of FIG. 1A.

FIG. 1B is an enlarged view of the innovative laser driver 110, which may be a laser diode driver (LDD). The LDD 110 is an integrated, fully programmable, multi-function product that controls and drives laser diodes (e.g., light source 115) within optical drives as described with reference to FIG. 1A. More specifically, the LDD 110 can apply the current for reading, writing, and erasing removable high capacity disks (e.g., capacities greater than approximately 50 Gbytes/disk). The LDD 110 also has low noise (e.g., noise of approximately 0.5 nA/rt-Hz), high speed (e.g., 800 Mb/s) and high current (e.g., approximately 1 amp). Any numbers included in this application are for illustrative purposes only and numerous alternative implementations may result from selecting different quantitative values.

At a high level, the LDD 110 may include a current generator 150. Generally, the current generator 150 receives some input signals 153 associated with several input channels, which have an associated input current. The current generator 150 works in tandem with current driver 160 and scales the input currents by some gain factors. The current at the output 195 is typically a summation of these scaled input currents from the individual channels. Thus, the current generator 150 and current driver 160 control the amount of current for each output 195. Besides receiving current signals from the current generator 150, the current driver 160 also receives signals from the current switch 155. The current switch 155 and the timing generator 175, via the serial interface, control which of the channels should be turned on or turned off. The timing generator 175 receives various channel enable inputs 190. Though there are five channel enable inputs that are shown in FIG. 1B, the LDD 110 may have any number of channel enable inputs, such as two, six, or the like. The timing generator 175 determines from the channel enable inputs 190 and serial interface control, whether a given input channel will be either turned on or turned off and transmits corresponding signals to the current switch. The current switch 155 processes these signals and then transmits signals to the current driver 160 designating which channels are active. The current driver 160 is the last current gain stage and drives the laser diodes directly. In other words, the output signals from the current driver 160 also serve as output signals for the LDD 110, which are used in driving the laser diode, or the light source 115 (see FIG. 1A).

In addition to the above-mentioned devices, the LDD 110 includes additional components. A serial interface (I/F) 170 has several inputs (e.g., serial data enable, serial data, serial clock) that may be used for programming the gain, enabling channels, and turning on the LDD. The LDD 110 also includes a high frequency modulator (HFM) 180 and voltage/temperature monitor (V/Temp Monitor) 185. The HFM 180 modulates the output current for reducing mode-hopping noise of the laser diodes. The voltage/temperature monitor 185 monitors the laser diode voltage drop and on-chip temperature. One skilled in the art will appreciate that numerous alternative implementations may result from removing any or several of the blocks within the LDD 110.

Though not illustrated, an integrated circuit for the LDD 110 generally has four switching, or write channels and one static, or read channel for each output. Each driver can be programmed independently from several milliamps to hundreds of milliamps. The current driver 160 includes a Laser Diode Write Driver (LDWD) 165 for each output that allows each switching channel to be programmed independently and has very fast switching times, low power, and good accuracy. The current driver 160 also includes a Laser Diode Read Driver (LDRD) 167 which produces a static current. The final output current is a summation of each individual switching channel from the LDWD and the static channel from the LDRD. The combination of the output currents from these channels are used to write data to the media Either the LDWD 165 or the LDRD 167 can optionally include wave-shape control circuitry. With this circuitry, each channel's wave-shape can be independently controlled which includes overshoot, rise-time, and fall-time as further explained below. Altering the wave-shape can improve the effectiveness in writing data to the optical media 120 (see FIG. 1A) in the case of the LDWD 165.

Figure 2B:
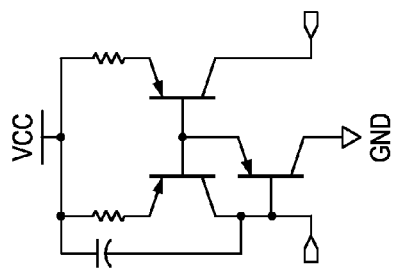
FIG. 2B is a circuit diagram of a current mirror with a beta-helper.
Figure 2C:
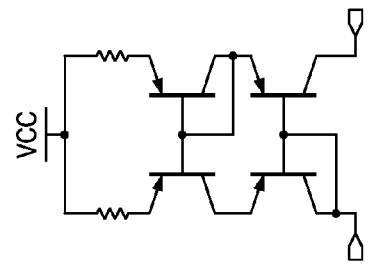
FIG. 2C is a circuit diagram of a Wilson current mirror.
Figure 2A:
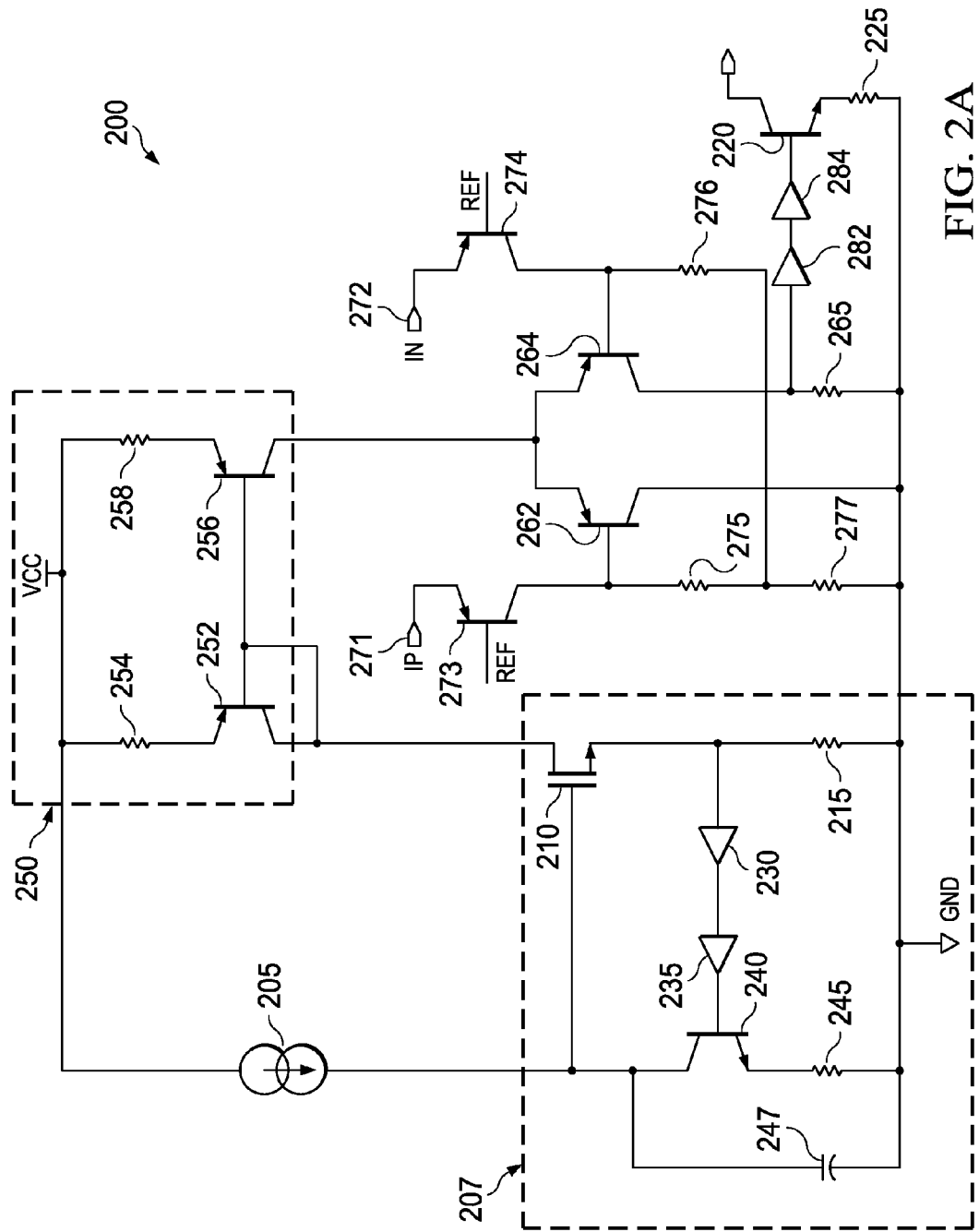
FIG. 2A is a circuit diagram illustrating a first implementation of the laser diode write driver of FIG. 1B.

FIG. 2A is one implementation of the LDWD 165 that shows a simplified circuit diagram 200 of a single channel driver. Though optionally shown as a single channel driver, other implementations of the LDWD 165 may include 2, 3, 5, or some other suitable number of channels. A current source 205 represents an input current, $I_{input}$, which is a scaled version of an output current, $I_{out}$ based on a gain factor, K. As a result, the input current $I_{input}=I_{out}/K$. As mentioned above, this input current may result from output current signals emitted from the current generator 150 as shown in FIG. 1B.

The circuit diagram 200 includes several components that form a feedback loop 207. The feedback loop 207 includes a transistor 210 that is shown as an n-type metal oxide semiconductor (MOS) transistor. Though shown as a MOS transistor, an alternative implementation may result from using other transistor types such as a bipolar transistor. The size and other characteristics of the transistor 210 determine the current range over which the loop will function properly, the amount of headroom for the input current source 205 and current mirror 250, and the accuracy of the loop. The feedback loop 207 also includes a resistor 215 coupled to a low voltage supply, or ground. The feedback loop 207 also includes two AB drivers 230, 235 coupled in series. These series-connected AB drivers can be characterized by unity gain with a very high input impedance and a very low output impedance. The output of the AB driver 235 connects to a base of a transistor 240, which is connected in series with a resistor 245. The size and other characteristics of the transistor 240 may be scaled to an output transistor 220, such that this output transistor is K times larger than the transistor 240 where K is a gain factor. The resistor 245 may also be scaled to the output resistor 225, such that its resistance may be the product of the resistance of the output resistor 225 and the gain factor, K. Finally, the feedback loop 207 can also include a capacitor 247 that sets a dominant pole within this loop for stability.

The transistor 210 and the feed back loop work in concert. As an input current $I_{input}$ enters this loop, the transistor's 210 gate will be driven high until this transistor starts conducting current through the resistor 215, which is tied to the low supply voltage or ground. A voltage develops across the resistor 215, which enters the AB driver 230. The output voltage from AB driver 230 enters the AB driver 235; the resulting output voltage from the AB driver 235 correspondingly drives the base of the transistor 240. The voltage at the base of the transistor 240 increases and it starts conducting. The feedback loop 207 eventually settles at a point where all of the input current, or $I_{out}/K$, conducts through transistor 240 and the resistor 245 to the ground.

As this feedback loop 207 reaches steady state, a voltage develops across the resistor 215 that is equivalent to the voltage at the base of the transistor 240. This voltage is equal to the input current times the resistance value of 245 plus the base-emitter voltage of 240. At that voltage transistor 240 will conduct all of the input current. The current through resistor 215 (developed by the voltage across 215) goes through the transistor 210 into a current mirror 250. This current mirror includes a transistor 252, resistor 254, transistor 256, and a resistor 258. For this current mirror, the current in transistor 252 gets replicated into transistor 256.

An alternative implementation may include more complex current mirrors with greater accuracy. For example, one alternative implementation may include a beta-helper that helps reduce base current losses associated with the transistor 252 and the transistor 256 as shown in FIG. 2B. FIG. 2C illustrates another alternative implementation which is a Wilson current mirror. The beta-helper implementation may be configured for unity gain or a higher gain that reduces the power.

The output current from the current mirror 250 enters a differential pair. The differential pair includes the transistors 262 and 264. The voltages on the bases of these transistors determine which way the current is steered. In other words, the base voltages determine whether current goes through the transistor 262 to the ground or whether the current goes through the transistor 264 and then the resistor 265 to ground. If the current goes through transistor 264, it develops a voltage across the resistor 265. In one implementation, the resistance of this resistor may have the same value as the resistor 215. The voltage across the resistor 265 will be the same as the voltage across the resistor 215 because the current through the resistor 215 is mirrored to be the same through the resistor 265. In another implementation, scaling the current from the current mirror 250 by a factor M and scaling the resistors such that 215 is M times larger than 265 can also produce a voltage that is the same across these resistors while reducing power.

The circuit diagram 200 includes two current-mode ports 271, 272 that either steers current into the resistor 265 or into ground. From the current port 271, the devices that connect between this port and the ground are as follows: transistor 273, resistor 275, and resistor 277. From the current port 272, the devices that connect between this port and the ground are as follows: transistor 274 and resistor 276, and resistor 277. With device 273 and device 274 set at a reference voltage, a voltage develops across an associated resistor depending on whether port 271 of 272 is receiving current. For example, when current flows through the transistor 274, a voltage may develop across the resistor 276 and resistor 277. Similarly, when current flows through the transistor 273, a voltage may develop across the resistor 275 and resistor 277. As the current switches between these transistors, the resistor 277 sets a common-mode voltage because it always has current in it as the current is switched from port 271 to port 272 and back again. If device 273 is conducting current, resistor 275 develops a voltage across it and the resistor 276 does not have a voltage across it so it will be at the common-mode voltage; this means that the base of device 264 is lower than the base of device 262 and the current conducts through device 264 into the resistor 265. The opposite is true when the current is switched. The voltage across 275 or 276 is set such that the differential pair 262 and 264 switches completely. The common-mode voltage is set such that the device 264 does not saturate when conducting current.

The voltage that develops across resistor 265 goes into a second pair of series connected AB drivers 282, 284 that are K times larger than the AB drivers 230, 235; one skilled in the art will appreciate that each AB driver may optionally be called a buffer, while two AB drivers may optionally be considered a buffering device. The characteristics of these AB drivers is the same as 230 and 235 which includes unity gain, high input impedance and low output impedance. Because AB drivers 282, 284 are scaled versions, they will set a voltage on the base of the device 220 that is essentially the same as the voltage at the base of the device 240. Because device 220 is K times larger than device 240, the current through the device 220 will be K times larger; the output current $I_{out}$, or driver output signal, is now a scaled version of the input current $I_{input}$ or input current signal.

This output current $I_{out}$ conducts through an external laser diode (e.g. a laser diode that is associated with the light source 115), with its cathode receiving the output current $I_{out}$; the corresponding anode for this laser diode will connect to another voltage supply. This output current $I_{out}$ will conduct when the resistor 265 is set to the same voltage as the resistor 215. When the current-mode inputs 271, 272 are switched such that the device 262 conducts, the voltage across the device 265 will return to ground and the output driver 220 will shut off. This write driver can be switched very quickly due to the current-mode inputs 271, 272 and the differential pair that includes device 262 and device 264. The value of the resistor 265 can be chosen so the voltage quickly decays to ground when the current switches. The AB drivers 282, 284 can be designed such that the voltage drop across the device 265 is minimized. The voltage drop consists of a diode and a small IR resulting in faster rise and fall times. The voltage at the base of the output device 220 which is set by the voltage drop across resistor 265 and the design of the AB drivers 282, 284, determines whether the output device is conducting or not conducting (on or off).

Figure 2D:
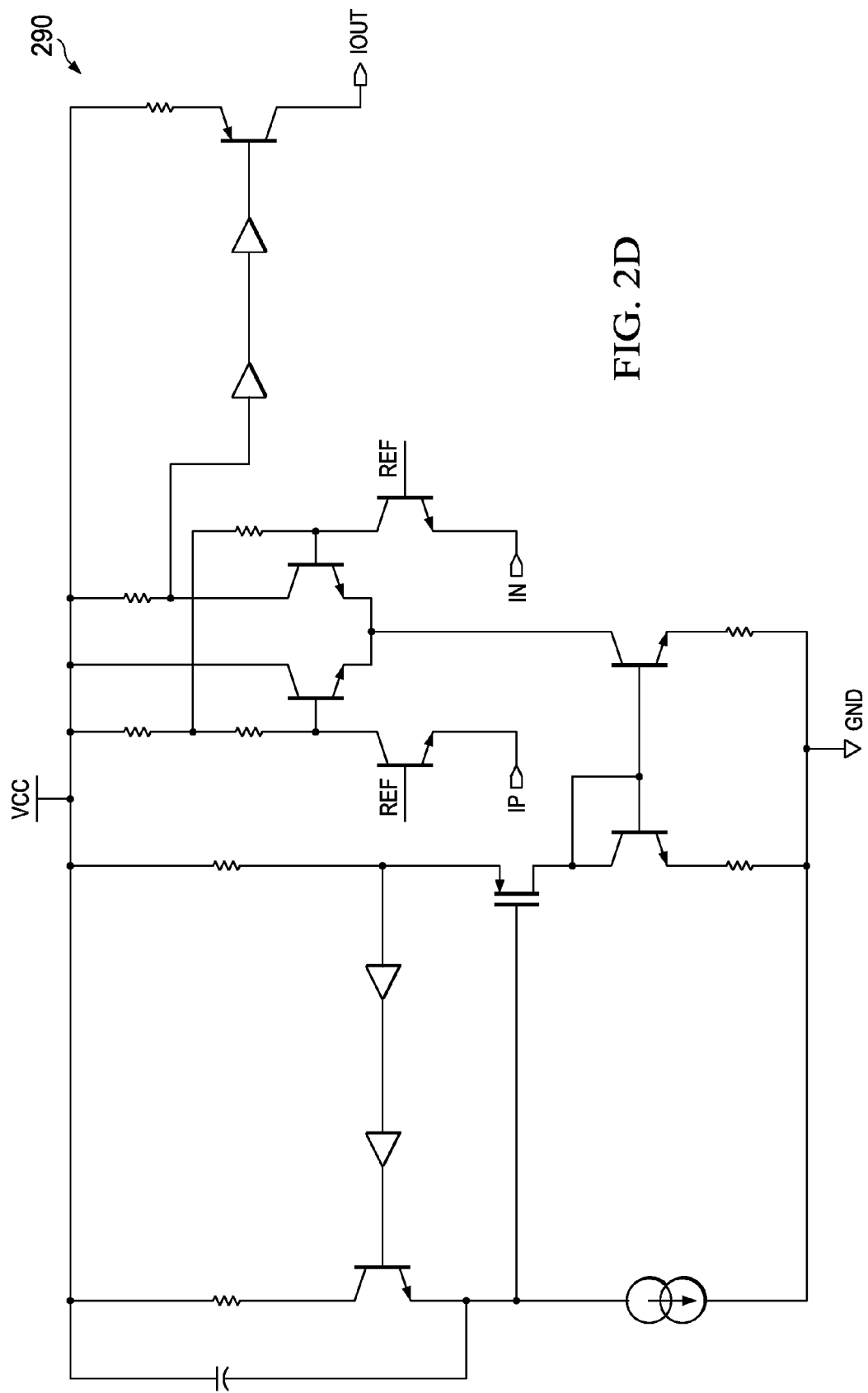
FIG. 2D is a circuit diagram illustrating a second implementation of the laser diode write driver of FIG. 1B.

FIG. 2D is a second implementation of the LDWD 165 illustrating a circuit 290 that has its anode connected to $I_{OUT}$ and its cathode connected to ground. Like the circuit 200, this circuit can drive a light source 115, such as a laser diode. One skilled in the art will appreciate that the circuit, though connected differently (essentially "flipped"), operates similar to the circuit 200.

Figure 3A:
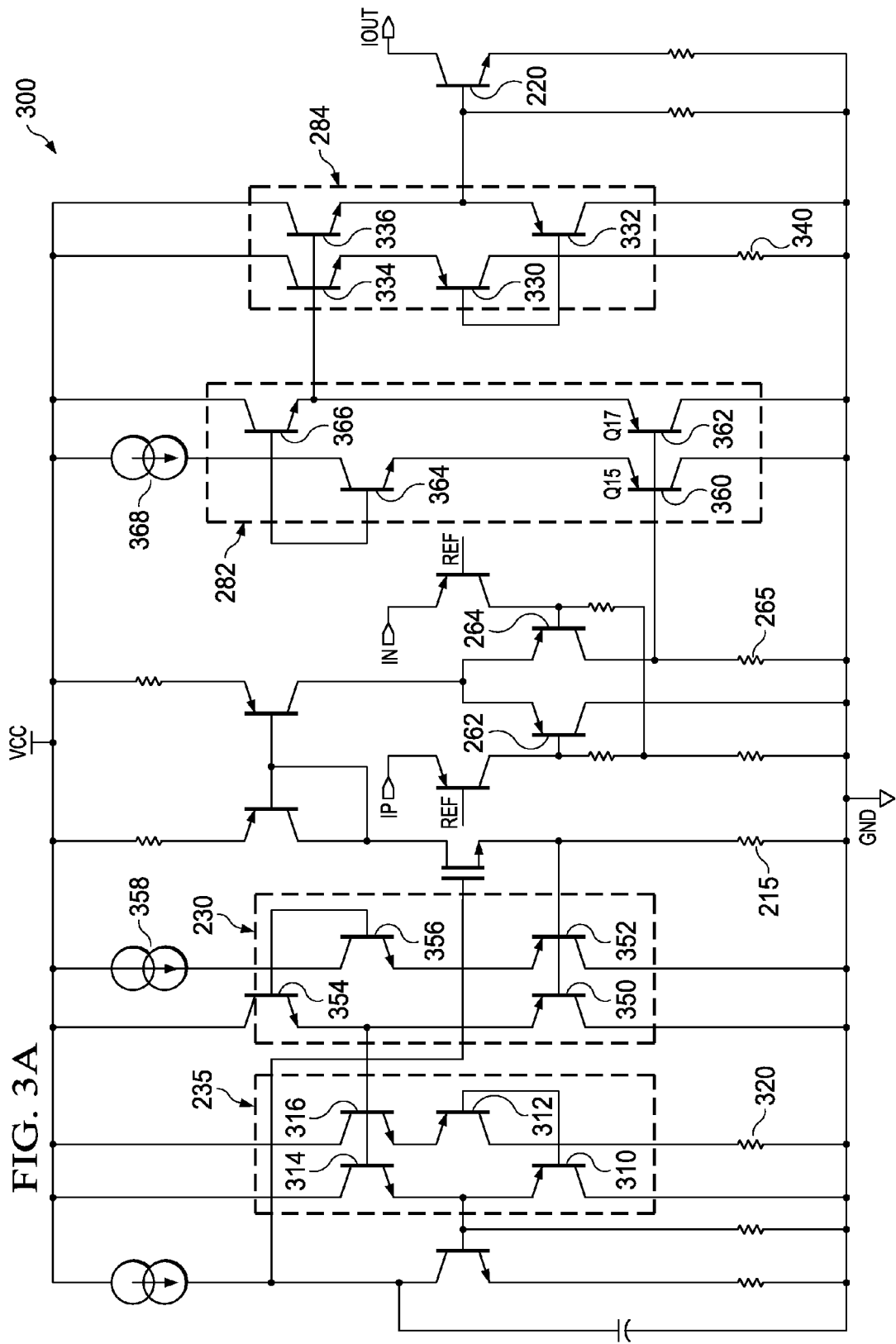
FIGS. 3A-3B are circuit diagrams illustrating implementations of the AB drivers of FIGS. 2A and 2D.
Figure 3B:
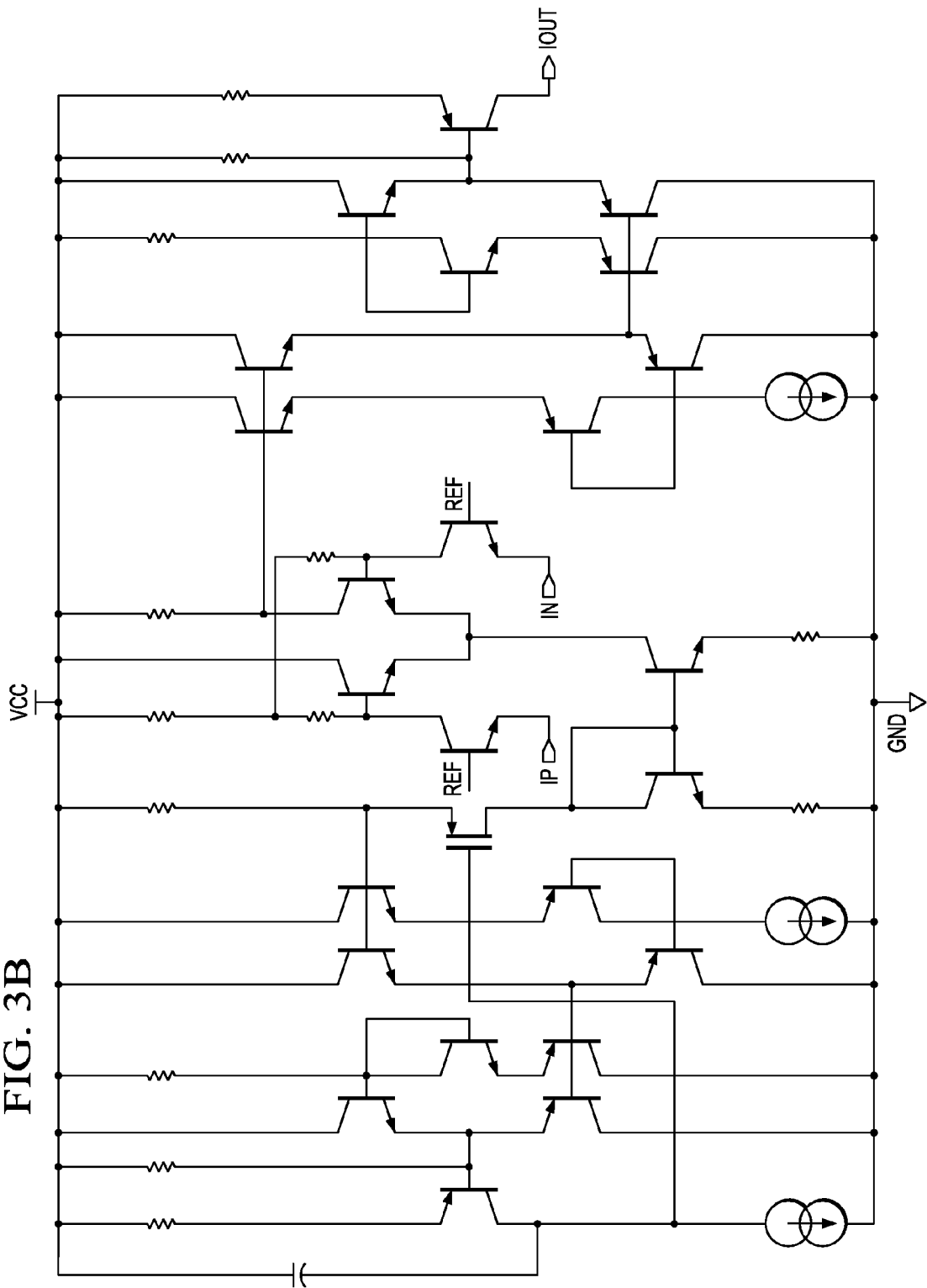

FIG. 3A is a circuit diagram 300 that shows one implementation of the AB drivers shown in FIG. 2A. Like FIG. 2D, FIG. 3B is a "flipped" version of FIG. 3A, which operates like FIG. 3A. Returning to this figure, the AB driver 235 includes four transistors 310-316; an alternative implementation of this driver may include a different number of transistors or transistors of a different type. Resistor 320 biases the AB driver 235. Device 316 receives an input voltage and produces a level shifted output voltage at device 314 emitter which is received by the transistor 240 (see FIG. 2A). The AB driver 284 includes the transistors 330-336 and can be scaled versions of the transistors 310-316; this AB driver can also produce a voltage to drive the output device 220. Like the resistor 320, the resistor 340 can bias the AB driver 284; the resistor 340 is K times smaller than the resistor 320, while the transistors 330-336 are K times larger than the transistors 320-326.

The AB driver 230 also includes four transistors 350-356 biased by current source 358; together these transistors receive an input voltage at device 352 base (which is the voltage across resistor 215) and level shift that voltage up a diode and output it at device 350 emitter. Similarly, the AB driver 282 also includes four transistors 360-366 and a bias current source 368. Device 360 receives an input voltage and that voltage is level shifted and output at device 362 emitter. The transistors 360-366 and current source 368 may be scaled versions that are K times larger that the transistors 350-356 and current source 358.

Using components within the circuit 300, designers can make selections that improve the power and the speed of the LDWD 165. Optimizing some current sources (e.g., current source 358, current source 368) or resistors (e.g., resistor 320, resistor 340) within the circuit 300 can dramatically improve the power or the speed. For example, increasing bias currents will make the AB drivers have a lower output impedance so they can drive the output device faster, but this increases power. Decreasing the current will typically slow down the switching of the output device. In addition, the AB drivers 230, 235, 282, and 284 may be configured such that the input into the AB driver 230 gets level shifted up one diode to its output and the input from the AB driver 235 gets level shifted down one diode to its output; thus the voltage drop across the resistor 215 is essentially equal to a diode and IR. This is the same for AB drivers 282 and 284. This impacts the speed and performance of this LDWD because the voltage drop that is across resistor 215 and also 265 is minimized and there is always parasitic capacitances associated with interconnect, etc and so the lower the voltage swing typically the faster the switching. In addition, the gain factor K can also be chosen for accuracy, speed, and power optimization. Some potential values for this gain factor may be 20, 40, or the like.

Figure 4A:
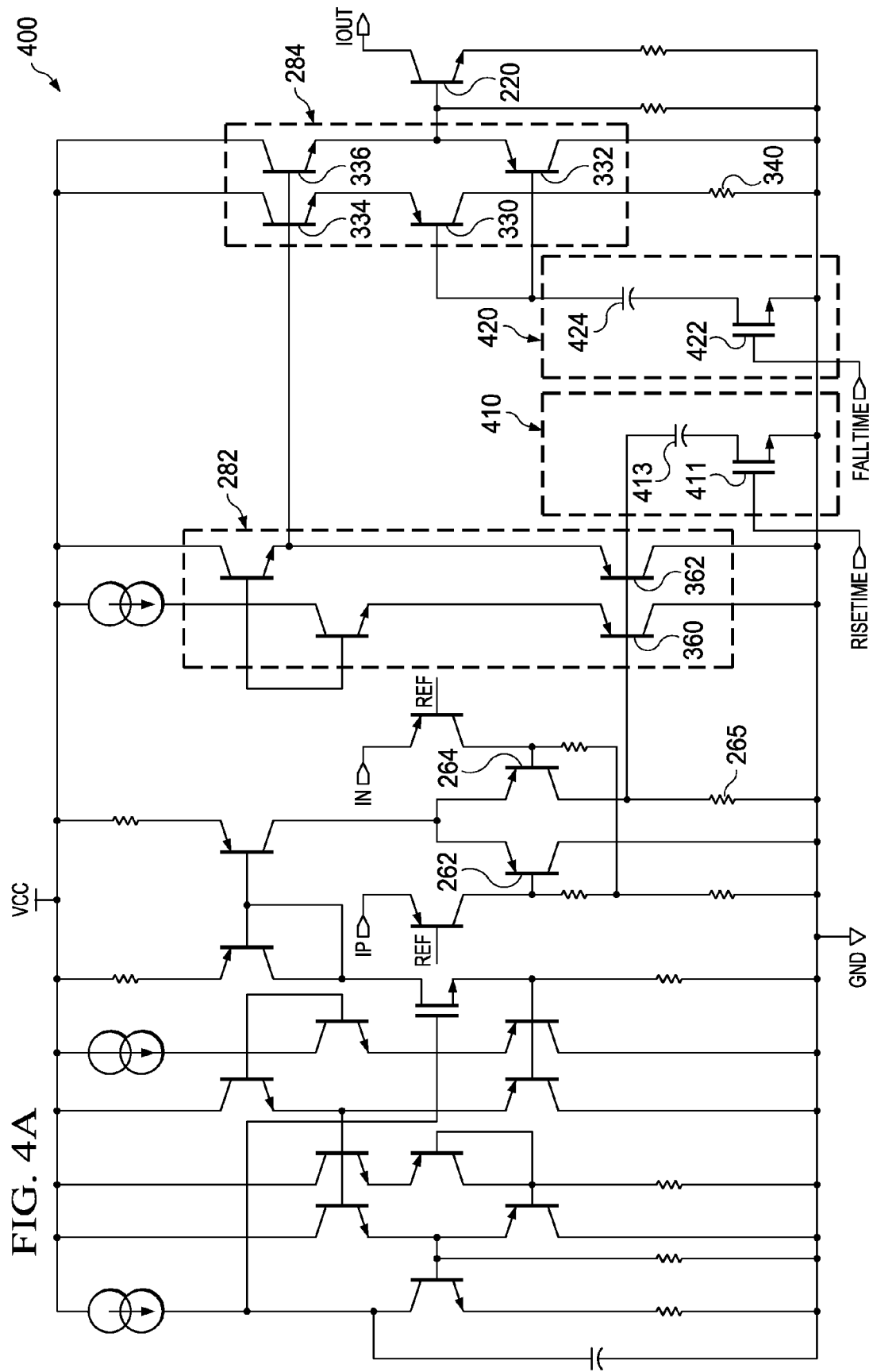
FIGS. 4A-4C are circuit diagrams illustrating a laser diode write driver with wave shape control of FIG. 2A for altering rise time and fall time.

The LDWD 165 may also include wave shape control, which may change the rise-time, fall-time, or overshoot of the output current waveform. FIG. 4A is a circuit diagram 400 for the LDWD 165 with wave shape control. Though similar to the circuit diagram 300 and similar devices are numbered the same, the circuit diagram 400 impacts wave shape control by including two devices. More specifically, this circuit diagram includes a rise-time variation device 410, which includes a switch, or transistor, 411 and a capacitor 413 connected to the bases of transistor 360 and the transistor 362. As current travels through the transistor 264 to the resistor 265, the AB driver 282 tracks the voltage across 265. The voltage on the resistor 265 develops quickly because of low capacitive loading on this node. This creates a fast rise-time that transfers through the AB driver 282 and the AB driver 284 to the output transistor 220. When the transistor 411's gate is at ground, it is off and there is high impedance between the drain and the source, such that the capacitor 413 has little effect on the resistor 265.

Figure 4B:
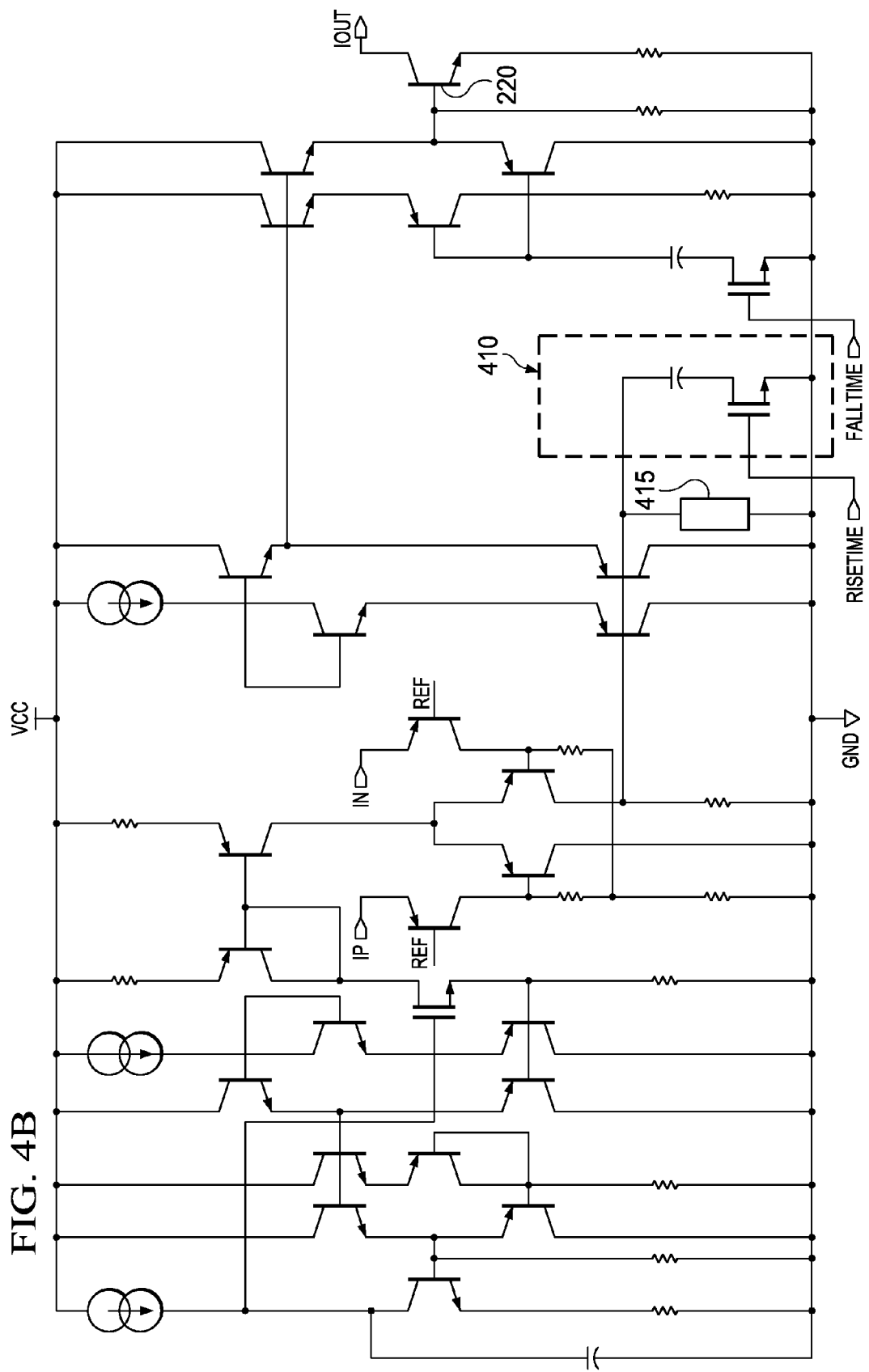

In contrast, changing the gate of transistor 411 to a voltage of approximately VCC turns on this transistor and there is low impedance from drain to source. Now, capacitor 413 is in parallel with the resistor 265. Thus, current from the transistor 264 charges both this capacitor and this resistor, which means that it takes longer for the current from the transistor 264 to reach its steady-state value. The voltage at the base of the output transistor 220 follows the input to the AB driver 282, which is essentially the voltage across the resistor 265. Since this voltage is now slower and the output transistor follows, the output current rise-time is slower. Therefore, including the rise-time variation device 410 can alter the rise-time of an output signal from the circuit diagram 400 for the LDWD 165. In another implementation, selecting certain device characteristics can create a desired output rise time. For example, one may select a certain size for the transistor 411 or a certain capacitance for the capacitor 413. Adding another rise-time variation device 415 in parallel with device 410 can make programmable rise times as shown in FIG. 4B. Though the devices within the rise-time variation device 415 are not shown, they may be either active or passive. In one implementation, they may include a MOS field effect transistor and a capacitor of a different value than the capacitor 411 and the transistor 413. Adding these devices can further slow the rise-time, which may further reduce overshoot and ringing, thus controlling the waveshape.

Figure 4C:
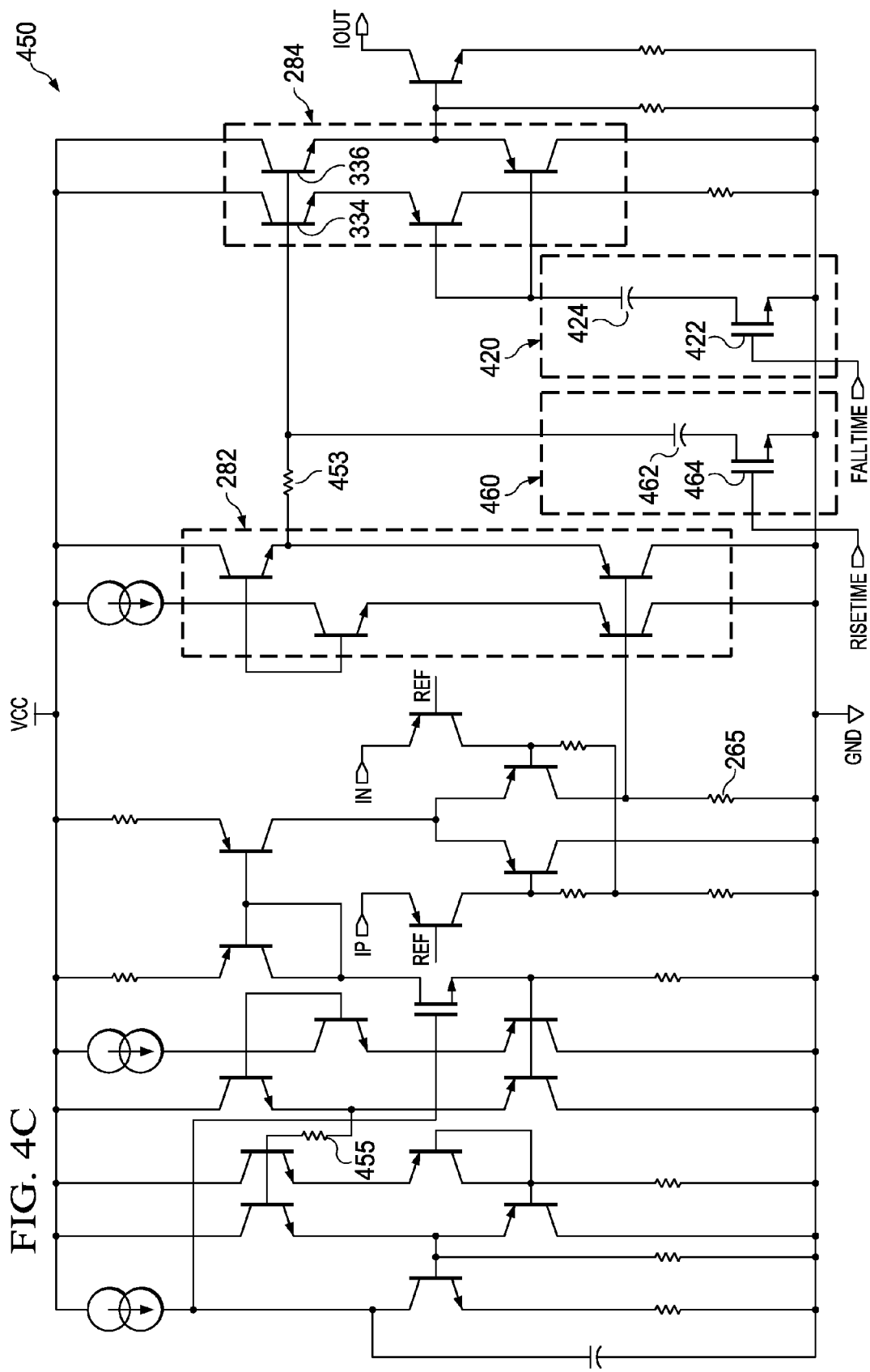

FIG. 4C is a circuit diagram 450 of an alternative implementation for the LDWD 165 with wave-shape control circuitry where the rise-time can be controlled. This circuit diagram includes a resistor 453 positioned between the AB driver 282 and the AB driver 284. Adding a resistor 455 in the control loop that is K times larger than the resistor 453 can compensate for any voltage drop across the resistor 453. The resistor 453 increases the output impedance of the AB driver 284 and helps isolate it from ringing; this ringing may be associated with either one or both of the voltage supplies due to inductance. The ringing can also be associated with driving a laser diode that has inductance associated with its package. If a rise-time variation device 460 connects to the bases of the transistor 334 and the transistor 336 within the AB driver 284, the AB driver 282 charges the capacitor 462 through the resistor 453 which also slows down the rise-time of the voltage that drives AB driver 284 so long as the gate of the transistor 464 is connected to voltage such that the device is on. When the transistor 464 is turned off, the capacitor 462 has very little effect on the rise-time. As with the other solution described with reference to FIG. 4B, several more devices can be added in parallel to make programmable rise-times by using different values of capacitors.

Returning to FIG. 4A, the circuit diagram 400 also includes a fall-time variation device 420 connected to the bases of the transistor 330 and the transistor 332 within the AB driver 284. The rise-time variation device 410, which decreases the rise time, generally does not have a large effect on the fall-time. The reason is because the resistor 340 is the most impactful on the fall-time along with the node that connects this resistor to the bases of the transistor 330 and the transistor 332. When the input to AB driver 284 decreases, the transistor 332 pulls the base of the transistor 220 down as its base is pulled down by resistor 340. When the transistor 332 has a smaller voltage $V_{BE}$ than the transistor 220, the transistor 332 can effectively turn off the transistor 220. When there is little capacitance on the base of the transistor 332, then the resistor 340 can quickly pull this base to a low supply voltage or ground. If there is capacitance on that node, then it takes longer to pull the node to ground and the transistor 220 takes longer to shut off. The fall-time variation device 420 may include a switch, or transistor 422, and a capacitor 424. The transistor 422 is a switch that is on or off and either adds the capacitor 424 to the circuit or acts as a high impedance that has little effect on the circuit. As described with reference to FIG. 4B, several more devices (e.g., mosfets and capacitors) can be added in parallel to accommodate different fall-times. The fall-time variation device 420 has little effect on the rise-time because when the AB driver is pulled high, the transistors 334 and 336 provide the current to pull-up on the base of the output transistor.

Figure 5:
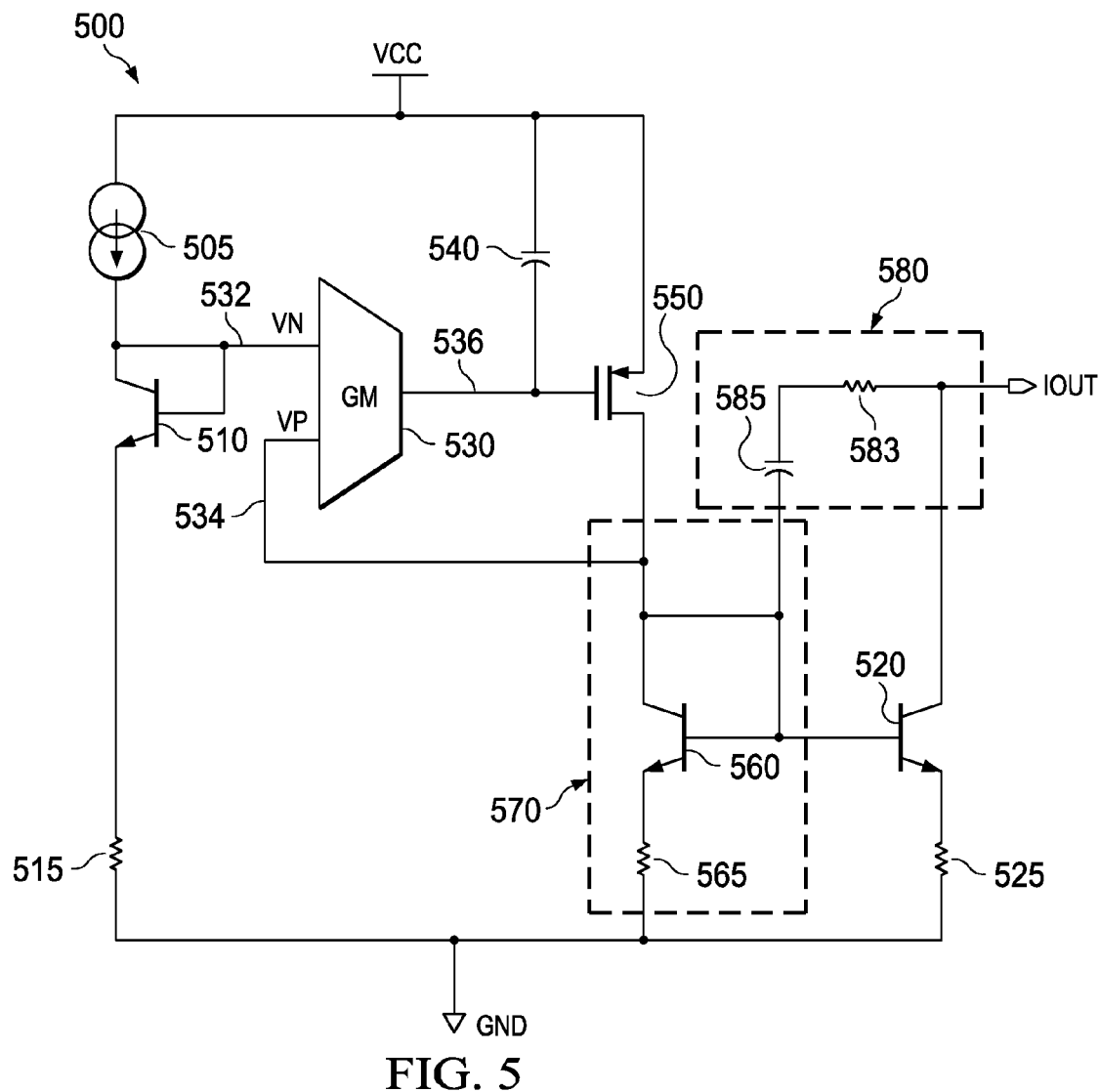
FIG. 5 is a circuit diagram illustrating a laser diode read driver of FIG. 2A showing damping circuitry.

As mentioned above, rise-time and fall-time variation devices can shape the output signals emitted from a driver. While the waveshape control described is applicable to a write driver, the read driver can also affect the waveshape. Returning to FIG. 1B, the LDD 110 may also include a laser diode read driver (LDRD) 167 that has wave shape control circuitry and can consequently impact an output signal 195. FIG. 5 is a circuit diagram 500 for the LDRD 167 that includes a wave shape control device 580.

FIG. 5 is a simplified circuit diagram 500 for one implementation of the LDRD 167. For this implementation, the circuit's cathode connects to the pin $I_{OUT}$ and the circuit's anode connects to a positive voltage supply. When there is a desired output current, the LDRD 167 can be designed to produce this desired current as illustrated in the circuit diagram 500. For example, the desired output current may be $I_{OUT}$ and the circuit diagram 500 may have a gain K associated with it. To produce this output current, the circuit diagram 500 receives an input reference current $I_{OUT}/K$ shown as current source 505, where K is the gain factor; this current may be from a current source, such as a previous stage in the current generator block 150. As this reference current enters this circuit, the current reaches ground by traveling through transistor 510 and resistor 515. While the transistor 510 is shown as an npn bipolar junction transistor, other implementations may result from using different transistor topologies. The transistor 510 is also a diode-connected transistor. The size of transistor 510 can be scaled to an output transistor 520 by the inverse of the gain factor, or 1/K, (e.g., area of transistor 510 may equal area of transistor 520*1/K). As current flows from current source 505 through transistor 510, it reaches resistor 515 and then encounters ground. As transistor 510 is scaled to transistor 520, resistor 515 can be scaled to the output resistor 525; for example, the value of resistor 515 can be the product of resistor 525 and the gain K. Matching the device 510 with the device 520 and the device 515 with the device 525 can improve the accuracy of the output current $I_{OUT}$ in relation to the input current $I_{OUT}/K$.

The input reference current $I_{OUT}/K$ 505 sets a reference voltage at the $V_N$ terminal 532 of the transconductor 530. The transconductor 530 has two input terminals and produces a current signal reflective of differences between signals received on its input terminals. As mentioned above, the transconductor 530 includes a $V_N$ terminal 532 and $V_P$ terminal 534 where $V_N$ is the voltage applied to the terminal 532 and $V_P$ is a voltage applied to the terminal 534. The values for these voltages may be the sum of $(I_{OUT}/K)*$Resistor 515 and the voltage of the diode connected transistor 510 or the like. The transconductor 530 produces an output current signal on terminal 536 that reflects a difference of the signals received on the terminal 532 and the terminal 534. The output current signal has an associated output current I where I=GM*(VP−VN). In this formula, GM is the transconductance of the transconductor 530, which may have a value 20 uS or the like.

As the output current signal emerges from the transconductor 530, it drives the capacitor 540. The size of this capacitor for this particular application is around 15 pF. The capacitor 540 can filter noise present in the output current signal that may be associated with a previous stage in the laser diode driver 110. In other words, noise in the output signals from the current generator 150 (see FIG. 1B) may appear as noise on the input terminal 532, which would appear as noise in the output current signal on the terminal 536. It is this noise in the output current signal that capacitor 540 can filter. The size for this transistor may be selected based on design parameters to get a desired amount of filtering.

The output current signal from the transconductor 530 also drives a metal oxide semiconductor (MOS) transistor 550. While shown as a MOS transistor, one skilled in the art will appreciate that the specific type of transistors within the LDRD 167 and the circuit 500 may vary depending on design objectives. This output current signal drives the gates of the transistor 550 to a voltage such that the voltage $V_P$ equals the voltage $V_N$ by outputting a current into the transistor 560 and the resistor 565, which goes to a low voltage supply. The size of the transistor 560 can scale to the transistor 510 or the transistor 520, if desired. Similarly, the resistance of the resistor 565 can scale to the resistor 515 or the resistor 525, if desired. In addition, the transistor 560 and the resistor 565 form a current mirror 570 that connects to the base of output transistor 520, the terminal 534 of the transconductor 530, the drain of the transistor 550, and the low voltage supply or ground.

The LDRD 167 illustrated by the circuit diagram 500 has an effective operation. As briefly mentioned above, this circuit diagram includes a high voltage supply $V_{CC}$, which may have a voltage of 5V associated with it. Current source 505, capacitor 540, and transistor 550 all connect to this voltage supply. In contrast, resistors 515, 525, and 565 all connect to the low voltage supply, or ground. Due to the closed loop or the connection of the current mirror leg 570, the transconductor 530, and the transistor 550, the voltage at the base of the transistor 560 and the base of the transistor 520 will be the same as the voltage on the base of the transistor 510. In other words, the voltage Vn at the base of transistor 510 terminal 532 equals the voltage $V_P$ on terminal 534 as explained above, which is applied the bases of the transistor 520 and the transistor 560. Because transistor 520 and resistor 525 are scaled to the transistor 510 and the resistor 515, the output current $I_{out}$ or current emerging from the LDRD 167 and the circuit diagram 500 will be a scaled replica of the input current by the gain factor K.

For the LDRD 167, the circuit diagram 500 may also include a waveshape control device 580 that may include one or more either active or passive devices. For this implementation, the device 580 includes a resistor 583 and a capacitor 585. The waveshape control device 580 connects to the base of the transistor 560 and the output terminal. Four switching channels may also be connected to this output node. Together the resistor 583 and the capacitor 585 can dampen the swing on the output signal, which reduces the overshoot and undershoot of the diode laser current. If the switching channels are increasing in current, the voltage on the output node $I_{OUT}$ would decrease, which tends to shut off or decrease the output current from transistor 520. The overall effect would temporarily decrease the output current while a switching channel is turning on having a dampening effect on the output waveform. The opposite occurs as current is decreased in the laser diode. In contrast, when the switching channels are decreasing in current, the voltage on the output node $I_{OUT}$ would increase, which tends to turn on the output transistor 520 harder, which increases the output current. This reduces the undershoot as the current from a switching channel is being turned off.

Figure 6B:
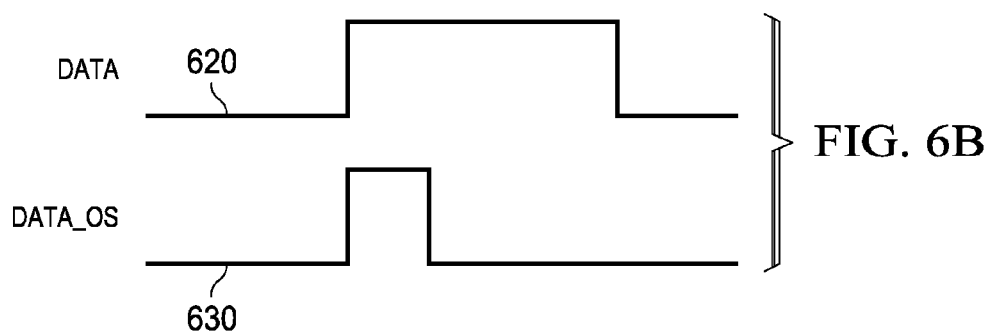
FIG. 6B is a comparative graph of the voltage for a data signal and the voltage for an overshoot signal as a function of time.
Figure 6A:
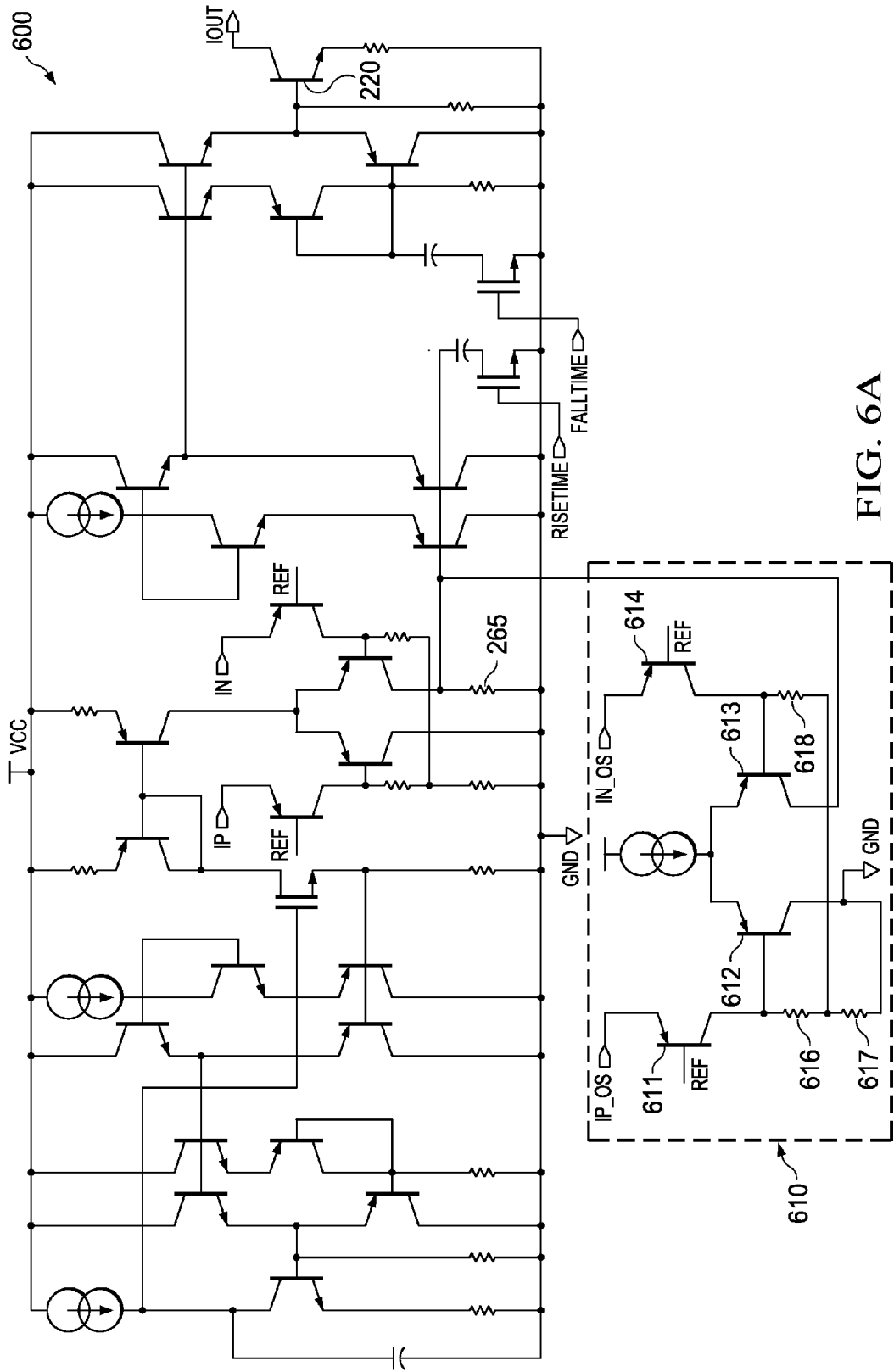
FIG. 6A is a circuit diagram illustrating a laser diode write driver with wave shape control of FIG. 2A for showing overshoot amplitude and pulse width control circuitry.

Returning to the LDWD 165, there is another implementation of waveshape control circuitry that can be used for controlling the overshoot. FIG. 6A is a circuit diagram 600 that includes a device 610 for controlling overshoot. In this implementation, the waveform overshoot can be controlled explicitly by adding a pulsing current source that pulses into the resistor 265 of the write driver channels for a specified duration and amplitude; each channel being independent. This increases the overshoot of a specific channel if desired. The device 610 includes switches, or transistors, 611-614 and resistors 616-618. In this device 610 like the data path, there is a differential pair, which includes transistors 612-613 that can either steer current into the resistor 265 or to ground. The tail current is $I_{OUT}/M$, where M is a scale factor. When the current is pulsed into the resistor 265, it increases the voltage; this increases the voltage on the base of the output transistor 220, which increases the output current. Turning to FIG. 6B, this figure is a comparative graph of the voltage for a data signal 620 and the voltage for an overshoot signal 630 as a function of time. As can be seen from the figure, the overshoot data is only on for a short period of the time the data signal is on, or switching time as shown.

With the LDWD shown in circuit diagram 600, the channel driver can be configured independently of the others, and its switching is independent. The driver has a very large dynamic range and the accuracy depends on the gain factor K and device matching. When properly scaled, the driver has very low power and provides very fast switching of the data. In addition, adjusting one of the wave-shape controls has very little impact on the other controls. The wave-shapes can be modified in several ways including rise-time, fall-time and overshoot to make a waveform that gives the best performance. Also, each of the controls is easily programmable with a minimal amount of additional circuitry. Finally, this wave shape control can be done in either the LDWD 165 or the LDRD 167.

While various embodiments of the laser diode driver with wave-shape control have been described, it may be apparent to those of ordinary skill in the art that many more embodiments and implementations are possible that are within the scope of this system. Although certain aspects of the laser diode driver with wave-shape control may be described in relation to specific techniques or structures, the teachings and principles of the present system are not limited solely to such examples. All such modifications are intended to be included within the scope of this disclosure and the present laser diode driver with wave-shape control and protected by the following claim(s).

What is claimed is:

1. A laser diode read driver circuitry comprising:
A. an input current source coupled between Vcc, a first transistor, a first resistor and ground;
B. transconductor circuitry having one input connected between the input current source and the first transistor, having another input, and an output;
C. a second transistor, a third transistor, and a second resistor coupled between Vcc and ground, the second transistor having an input coupled to the output of the transconductor circuitry, the third transistor having an input, and the another input of the transconductor circuitry being coupled to between the second transistor and the third transistor;
D. a fourth transistor and a third resistor coupled between an output and ground, the fourth transistor having an input connected to the input of the third transistor and to between the second transistor and the third transistor, the fourth transistor having an area; and
E. wave shaping circuitry coupled between the inputs of the third and fourth transistors and the output.

2. The circuitry of claim 1 in which the first transistor has a first area that is scaled to an area of the fourth transistor by the inverse of a gain factor K.

3. The circuitry of claim 1 in which the wave shaping circuitry includes a capacitor and a fourth resistor coupled in series.

* * * * *